United States Patent [19]

Chambers

[11] Patent Number: 4,706,796

[45] Date of Patent: Nov. 17, 1987

[54] SYSTEM FOR TRANSFERRING AND LOCATING A BODY RELATIVE TO A SUPPORT

[75] Inventor: Robert W. Chambers, Willingboro, N.J.

[73] Assignee: RCA Corporation, Princeton, N.J.

[21] Appl. No.: 762,634

[22] Filed: Aug. 5, 1985

[51] Int. Cl.⁴ ............................................. B65G 47/00
[52] U.S. Cl. ........................................ 198/345; 269/56
[58] Field of Search ............... 198/345; 269/56, 296, 269/308, 309, 310; 29/33 P, 464, 559, 563, 564, 784

[56] References Cited

U.S. PATENT DOCUMENTS

| | | | |
|---|---|---|---|
| 227,252 | 5/1880 | Hodges . | |
| 2,249,230 | 7/1941 | Schafer | 77/3 |
| 2,819,784 | 1/1958 | Brown, Jr. . | |
| 3,175,820 | 3/1965 | Schiler | 259/296 |
| 3,491,977 | 1/1970 | Iller | 248/358 |
| 3,540,318 | 11/1970 | Greenberg | 77/1 |
| 3,606,300 | 9/1971 | Davis | 269/296 |
| 3,690,433 | 9/1972 | Baldini | 198/345 |
| 3,826,047 | 7/1974 | Binder | 51/277 |
| 3,888,341 | 6/1975 | Konkal et al. | 198/345 |
| 4,185,812 | 1/1980 | Hall | 269/56 |
| 4,201,284 | 5/1980 | Brems | 198/345 |
| 4,217,978 | 8/1980 | Stalker | 198/345 |
| 4,239,445 | 12/1980 | Ozawa | 414/749 |
| 4,253,559 | 3/1981 | Myers et al. | 198/345 |
| 4,257,513 | 3/1981 | Siarto | 198/345 |
| 4,275,983 | 6/1981 | Bergman | 198/345 X |
| 4,331,229 | 5/1982 | Kamm | 198/345 |
| 4,390,172 | 6/1983 | Gotman | 269/56 |
| 4,393,999 | 7/1983 | Forshee | 248/346 |
| 4,429,862 | 2/1984 | Niedecker | 269/309 X |
| 4,585,217 | 4/1986 | Erickson | 269/56 |
| 4,586,702 | 5/1986 | Chambers | 198/345 X |

OTHER PUBLICATIONS

"FMS Starter Kit", SI Handling Systems, Inc., *Bulletin No. 483*, Apr. 1983.

*Primary Examiner*—Robert J. Spar
*Assistant Examiner*—Lyle Kimms
*Attorney, Agent, or Firm*—Allen LeRoy Limberg; William Squire

[57] ABSTRACT

A pallet is releasably attached to a car which is stopped automatically at a work station in a coarse alignment with a robotic system at the work station. A movable plate, which tends to be distorted from a given shape, is releasably secured to the car and lifted from the car at the work station, aligned in the desired fine alignment during the lifting and then clamped in place relative to a reference plane in the fine alignment relative to the robotic system to remove the distortion. The plate is later dropped by gravity onto the car in a given alignment therewith for transfer to the next work station which repeats the fine alignment and distortion removal action.

8 Claims, 6 Drawing Figures

SYSTEM FOR TRANSFERRING AND LOCATING A BODY RELATIVE TO A SUPPORT

This invention relates to a transfer system for locating an article at a work station and for orienting the article relative to the work station.

It is common in a manufacturing environment to employ a workpiece conveying system for transferring workpieces to and between work stations. In robotic systems it is especially important to accurately locate and orient workpieces transferred by the conveyor system. Small workpieces are relatively easy to handle and locate due to their relatively small size and weight. Relatively small workpieces are often carried by a palletized system which include nests or recesses for aligning the workpieces with respect to the work station. The recesses may orient the workpieces in a coarse alignment and the workpieces may be then oriented to a fine orientation by the robotic system.

However, relatively large electronic systems such as, for example, a television receiver, present locating problems not present with smaller workpieces. These problems are enhanced by the increased overall dimensions and weight of the receiver. In one automated system, for example, it is desired that the receiver be assembled, tested or otherwise operated on in a manufacturing environment at one or more work stations by a corresponding robotic system. The receiver may include one or more control panels on the rear cover, the front cover or elsewhere and may include different components mounted on a chassis internal the receiver cabinet. It is a requirement in assembling such a receiver to make adjustments or assemble the different components to the chassis and cabinet. These adjustments and assembly procedures, if be made by a robotic system, as compared to prior manual operations, require accurate location and orientation of each robotically handled component or tool relative to the receiver within a small tolerance range, for example, within 0.005 inch in three orthogonal directions. One such adjustment might be using a screwdriver like tool to adjust a potentiometer for achieving optimal picture quality. Such an adjustment may be required to be made horizontally or vertically or in any of three orthogonal directions.

A problem with aligning television receivers relative to a robotic system is attributed, in part, to the nature of their construction. Many receivers include thermoplastic molded housings which tend to differ dimensionally from cabinet to cabinet. A relatively heavy picture tube needs to be connected to such a cabinet as does the electronic chassis. Such a chassis and tube, due to their weights, can cause significant flexing and bending of the cabinet structure. The problem of aligning such a cabinet and assembly structure to a pallet is dealt with in copending application Ser. No. 762,633, entitled "SYSTEM FOR ORIENTING ONE BODY RELATIVE TO A SECOND BODY IN THREE ORTHOGONAL DIRECTIONS," filed concurrently herewith by the present inventor, and assigned to the assignee of the present invention, now U.S. Pat. No. 4,586,702. The disclosed system therein describes the location and orientation of such a television receiver to a pallet so that the receiver can be operated on by a robotic system.

However, as is often the case, such a receiver also needs to be transported from work station to work station for partial assembly by different operators or robotic systems. It is important, therefore, to be able to locate the pallet carrying the receiver to a given work station and to the robotic system at that work station. Present conveyor systems include different configurations for transporting such receivers. One commercially available conveyor system of interest employs cars which roll on tracks and includes a mechanism for stopping and starting the cars at a given work station. However, this system does not meet the tolerance requirements for locating and orienting the carried television receiver pallet relative to a work station.

A transfer system according to the present invention for transferring and orienting a body relative to a support at a work station comprises a support having a plurality of spaced reference surfaces defining a reference plane. Transfer means are coupled to the support for displacement of the body into alignment with the surfaces. The body has a plurality of spaced reference surfaces, each surface corresponding to a different one of the support reference surfaces. The body and transfer means include means for releasably securing the body to the transfer means in a given coarse alignment therewith. Actuating means include means responsive to the alignment of the transfer means with the support reference surfaces for displacing the body from the transfer means. The actuating means lock the body reference surfaces in engagement with the support reference surfaces at the reference plane to substantially remove distortions in the body. Body orienting means are secured to the actuating means and to the body. The orienting means automatically orient the body in a fine reference orientation relative to the coarse alignment in response to the displacing and prior to the engagement of the body reference surfaces to the support reference surfaces.

Figure 1:
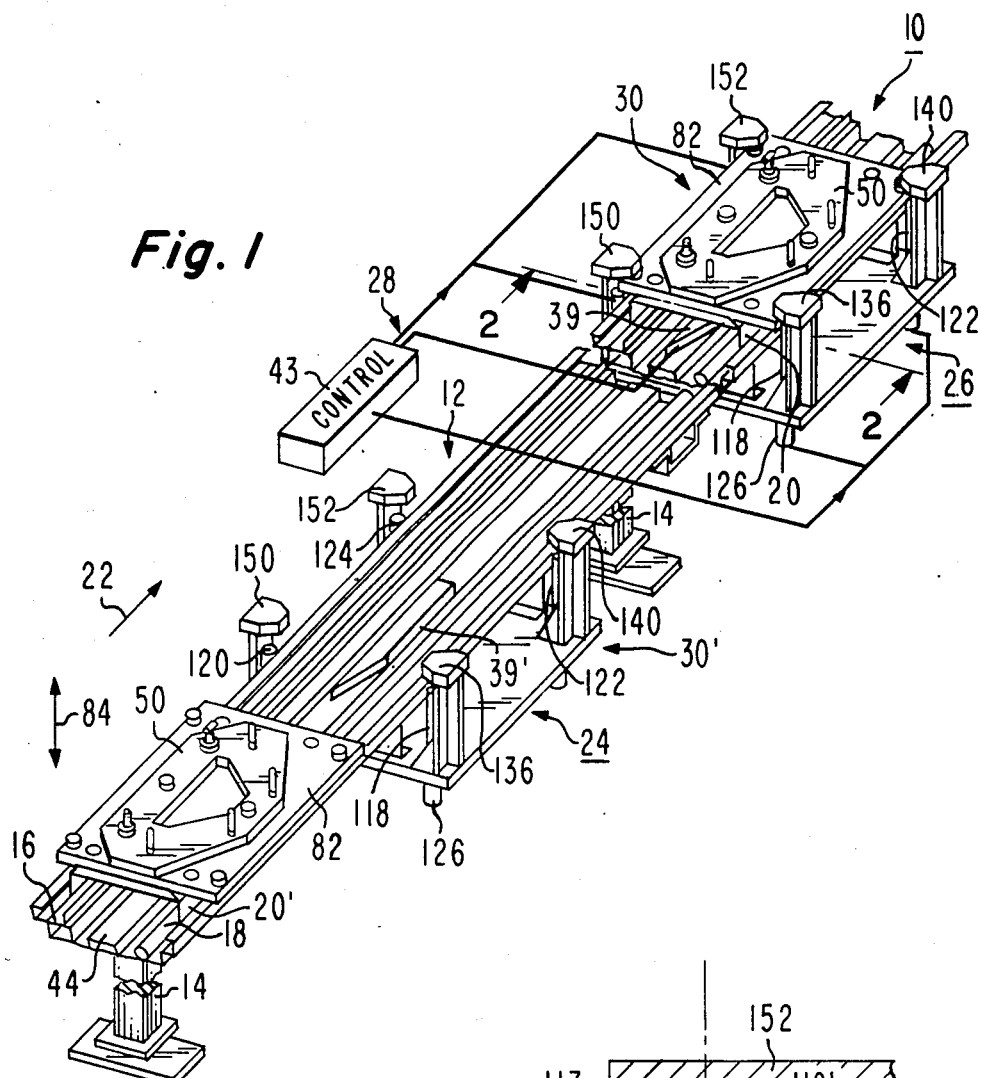
FIG. 1 is a partially fragmented. isometric view of a portion of the transfer system in accordance with one embodiment of the present invention.

In FIG. 1, transfer system 10 includes a track assembly 12, only a portion of which is shown, supported by a plurality of spaced pedestals 14. The track assembly 12 includes a pair of parallel tracks 16 and 18 on which rides a car 20. The car 20 moves in direction 22 from work station to work station, for example, work station 24 to work station 26. While only two work stations are shown, in practice, many more would be provided along track assembly 12.

Work station 26, which is typical, includes system 28 for stopping and starting the movement of car 20 which will be described in more detail later. Located adjacent to one or more of the stations 24 and 26 are robots (not shown) for automatically assembling or operating on workpieces attached to one or more of the cars 20. Car 20 is used in the disclosed embodiment to transfer a television receiver 46, FIGS. 2 and 4, (not shown in FIG. 1 for simplicity of illustration). However, the system 10 could be employed to transfer other workpieces as well. Attached to one or more of the work stations 24, 26, and so forth, FIG. 1, are respective workpiece locating and orienting systems 30' and 30. System 30 is typical and locates and orients the workpiece relative to a reference position having a given orientation at work station 26. A system, for example, system 30', work station 24, similar to system 30 may be located at each work station in which a robot operates on the workpiece. Each locating and orienting system is physically referenced relative to the robotic system (not shown) at the corresponding work station to accurately position the workpiece carried by the car 20 to the robotic system.

Figure 2:
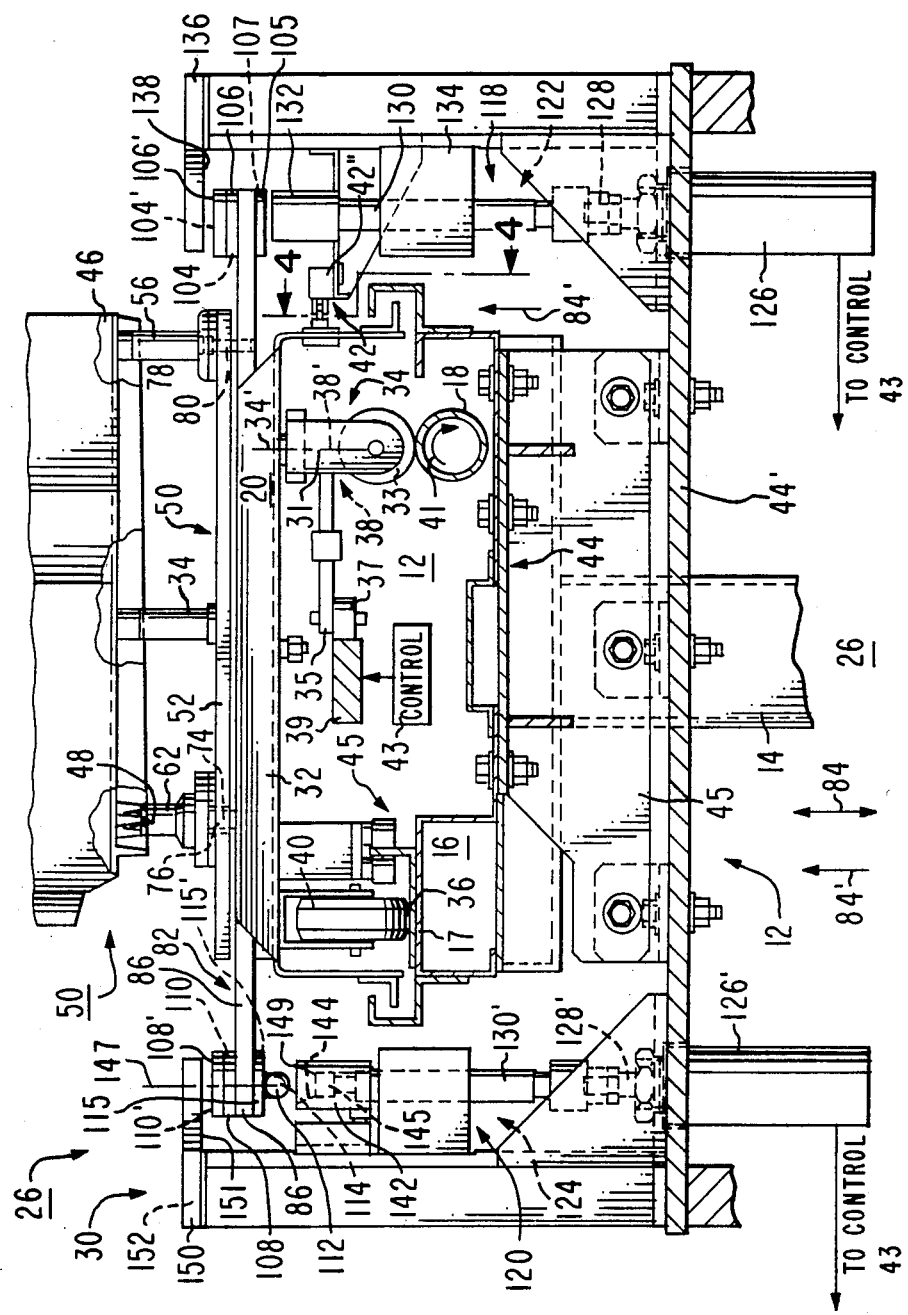
FIG. 2 is a sectional view of the system of FIG. 1 taken along lines 2—2.
Figure 4:
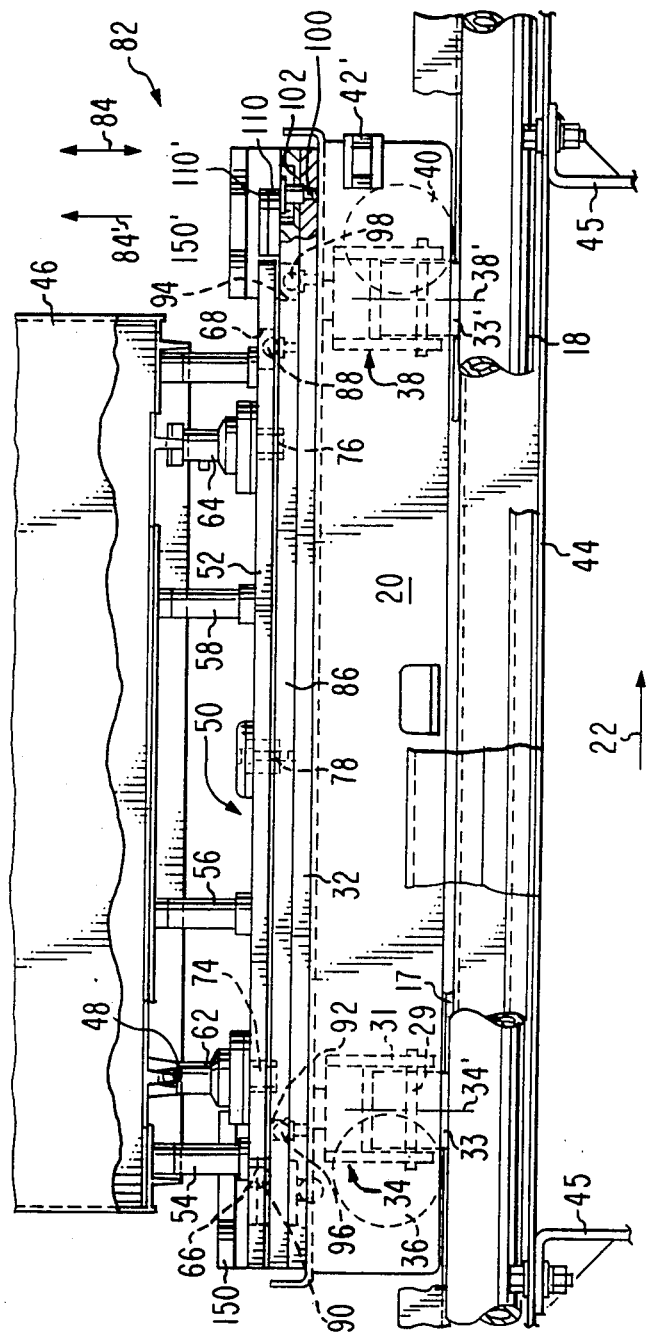
FIG. 4 is a partially fragmented sectional view of the embodiment of FIG. 2 taken along lines 4—4.

A typical locating and orienting system 30 is shown in FIGS. 2 and 4. Wheel assemblies 34 and 38 are rotatably attached to the car carriage 32 to swivel about respective spaced vertical axes 34' and 38'. Assemblies 34 and 38 are similar and only assembly 34 will be described. Assembly 34 includes a yoke 31 which swivels about axis 34' relative to carriage 32. Wheel 33 rotates about axle 29 secured to yoke 31. Assemblies 34 and 38, FIG. 2, are coupled by resiliently biased linkage 35.

Linkage 35 includes a cam follower wheel 37 which resiliently engages cam 39 secured to track assembly 12, FIG. 1. Cam follower wheel 37 is normally biased to the left of its position of FIG. 2. As shown, follower wheel 37 is engaged with cam 39 and is pushed by its engagement with cam 39 to the right of its normal free position at work station 26. The forward motion of car 20 direction 22, FIG. 1, causes this displacement of follower wheel 37 when the wheel engages cam 39. The wheels 33 and 33' of respective assemblies 34 and 38 ride on track 18, FIG. 4, which is an elongated rotating circular tube which is continuously rotated (by means not shown) about its long axis in direction 41, FIG. 2. This rotation continuously rotates wheels 33 and 33' at all times.

Wheels 36 and 40, FIG. 2, on the other side of car 20 are free rolling and ride on track 16 which comprises a fixed rectangular tube 17. Wheels 36 and 40 are oriented to always roll car 20 in direction 22, FIG. 1. Assembly 45, FIG. 2, guides the car 20 and keeps the car on the tracks. In FIG. 2, the tracks 16 and 18 are supported on a support structure 44, attached to pedestals 14. Suspended below and to structure 44 at each work station via gussets 45 (only one shown in FIG. 2) is a horizontal support 44'.

In FIG. 2, direction 22 of FIG. 1 is normal to the plane of the drawing FIGURE and is parallel to the track 18 long axis. The car 20 is shown stopped at work station 26. In FIG. 2, wheel assemblies 34 and 38 are shown oriented for rotation about their respective axles parallel to the rotation direction 41 of track 18 in a plane normal to direction 22, FIG. 1. Thus, although wheels 33 and 33', FIG. 4, are rotating, the car 20 can not move in direction 22.

When it is desired to move car 20 from station 26, control 43 generates a signal to displace cam 39 to the left of the drawing, FIG. 2. This action releases spring-operated linkage 35. The released linkage resiliently biases the wheel assemblies 34 and 38 about respective axes 34' and 38' so their wheels 33 and 33' rotate in parallel planes canted relative to the position of FIG. 2 and the forward direction 22 of FIG. 1. The canting of the rotating wheels imparts a force component to the wheels in direction 22 causing a forward motion of car 20 in direction 22. Control 43 selectively returns the cam 39 to the position of FIG. 2, such as shown at station 24, cam 39'. In this position the cam is ready to receive and rotate the wheel assemblies 34 and 38 about axes 34' and 38', respectively, of the next car that enters the work station in direction 22, FIG. 1. The car 20 and track assembly 12 are commercially available and need not be described further herein.

System 28, FIG. 1, includes sensor 42, FIG. 2 coupled to the track assembly 12 and to the car 20 to mutually engage and sense the presence of car 20 at the work station. The sensor 42 may include a microswitch 42" secured to support 44, FIG. 2, or magnetic sensor (not shown) and a sensor plate 42' on car 20. Sensor 42 senses the presence of car 20 at a given work station to generate the desired system 28 operating signals. The system 28, as commercially available, includes control 43, FIG. 2, which may include a self-timing circuit responsive to sensor 42 for operating cam 39 and releasing car 20 for movement to the next work station at the end of a given time interval. Control 43 may include, in the alternative, a system responsive to the robot (not shown) at the work station for releasing the car when the robot's task is completed. Still other systems represented by control 43 may be used to control the release of car 20 from the work station at the desired time.

The commercial system for stopping the car 20 at a given work station, e.g., the rotation of wheel assemblies 34 and 38 about respective axes 34' and 38', FIG. 4, is such that without additional structure, the workpiece, for example, television receiver 46, FIGS. 2 and 4, is not located within the desired reference tolerance range, for example, within 0.005 inch at the work station. The apparatus according to the present invention provides such additional structure.

In FIGS. 2 and 4, receiver 46 is located accurately in three orthogonal directions to a pallet reference point 48 by a locating pallet assembly 50. Pallet assembly 50 as illustrated herein, can be as described in more detail in the aforementioned copending application. That disclosed assembly is for particularly locating thermoplastic molded workpieces such as a television receiver cabinet which may have relatively large dimensional variations among different workpieces. However, other pallet systems may be used in the alternative if the workpiece can be relatively accurately positioned thereto. For the purposes of the present invention, it is assumed that pallet assembly 50 or any other pallet system accurately locates the workpiece to the pallet thereof within the desired tolerance. The present invention is used to accurately align such a pallet assembly and its carried workpiece to a workstation, such as station 26, FIG. 1. Therefore, the details of assembly 50 need not be given herein as this is but one example of a locating pallet system for one particular type of workpiece, i.e., a thermoplastic television receiver cabinet and associated electronics.

Figure 5:
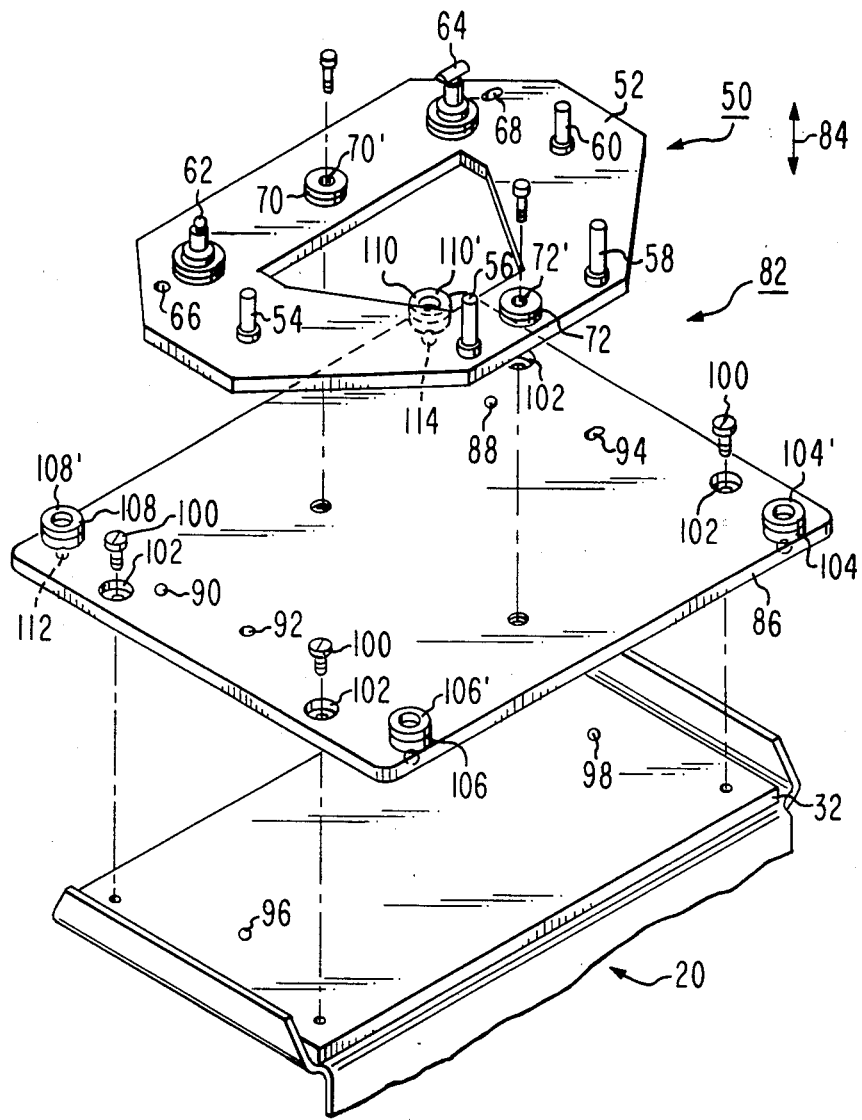
FIG. 5 is an exploded view of a portion of the embodiment of FIG. 3.

Assembly 50, by way of example, FIGS. 2, 4, and 5, includes a pallet plate 52 and an array of locating stanchions 54, 56, 58, 60 and resilient locating plungers 62 and 64 having mating cooperating elements on the workpiece 46 for locating the workpiece 46 to the plate 52 reference point 48 as described in more detail in the aforementioned application. The plungers orient the pallet plate horizontally relative to a given vertical reference plane and the stanchions orient the plate vertically relative to a horizontal reference plane.

Figure 3:
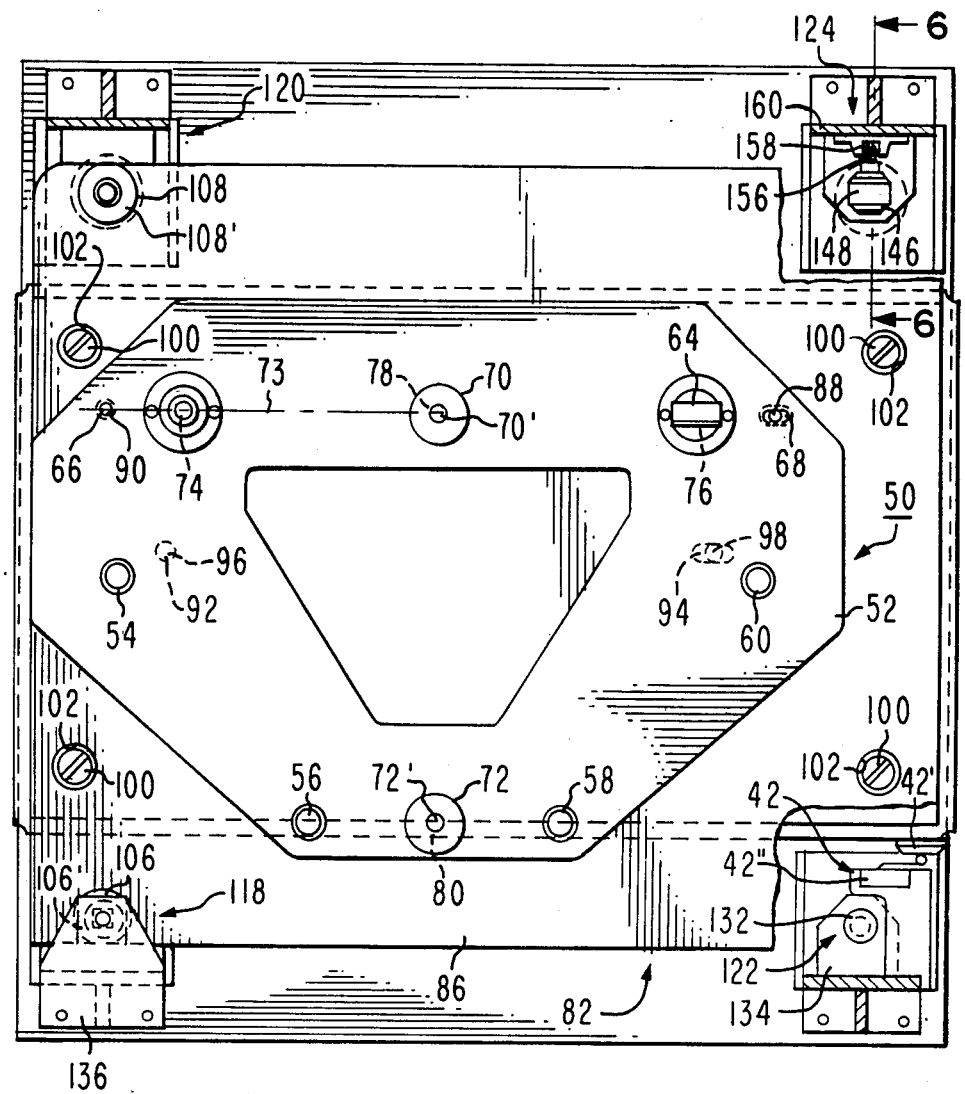
FIG. 3 is a plan view of a portion of the system of FIG. 1 showing the transfer system in more detail.

In FIG. 3, pallet plate 52 includes a circular locating aperture 66 and an elongated locating aperture 68 aligned on axis 73. Also, two pallet plate bosses 70 and 72, have respective apertures 70' and 72' through which screws pass to fasten plate 52 to plate 86. In FIGS. 2 and 4, plate 52 includes a plurality of locating elements 74, 76, 78, and 80 which depend from and project beyond plate 52 to locate plate 86 vertically on mating reference surfaces of plate 86. This locates the workpiece reference point 48 which relates to the position of the receiver 46 in three orthogonal directions, in the vertical directions 84 relative to assembly 82 plate 86.

In FIGS. 4 and 5, two spaced locating spheres 88 and 90 are secured to and project upwardly from plate 86. Spheres 88 and 90 are closely received in respective apertures 68 and 66 of plate 52, FIGS. 3 and 5. Because only one-half of the sphere contacts the respective aperture, a hemispherical body could alternatively be used. These spheres and apertures accurately locate plate 52 relative to plate 86 in two orthogonal horizontal directions. The receiver 46 is thus accurately positioned relative to plate 86 in three orthogonal directions.

Plate 86, FIG. 5, includes a circular locating aperture 92 and an elongated locating aperture 94 which define two orthogonal horizontal reference axes. Carriage 32 has two projecting spheres 96 and 98, respectively, received and located by plate 86 apertures 92 and 94. Spheres 96 and 98, when engaged with respective apertures 92 and 94, locate plate 86 in the two reference horizontal orthogonal directions relative to the carriage 32. Plate 86 rests via the force of gravity on horizontal carriage 32. Upstanding from carriage 32 are four screws 100 having enlarged heads. Screws 100 captivate plate 86 to carriage 32 via plate 86 openings 102. There is sufficient clearance between the screws 100 and the corresponding openings 102 to permit plate 86 to float relative to these screws and be raised vertically relative to carriage 32. These screws serve to preclude the plate 86 from lifting free of carriage 32 beyond a desired amount.

As it will be recalled, the present invention deals with the problem that the assembly described so far, as attached to the car 20 (FIG. 5) may not locate the pallet assembly 50, and thus its carried receiver 46 (FIG. 2), to within the desired accuracy for operation by the robotic system at a given work station. To compensate for gross errors in the location of the car 20 relative to the work station reference location established by the robotic system thereat, the assembly 82 is movable relative to and can be lifted from the car 20, and more particularly, from carriage 32 to an assembly 82 reference position established by locating system 30.

The assembly 82 and the attached pallet assembly 50 and workpiece, when they reach a work station, are automatically lifted from the car 20 and located accurately in three orthogonal directions by the work station locating and orienting system 30, FIG. 1. To so locate assembly 82 (FIG. 5) attached to plate 86 are four upstanding locating cylindrical assemblies 104, 106, 108, and 110 having respective coplanar upwardly facing reference end surfaces 104′, 106′, 108′, and 110′. Surfaces 104′, 106′, 108′, and 110′ may be formed on hardened steel upper wear plates secured to plate 86. Aligned with surfaces 104′, 106′, 108′, and 110′ are lower wear plates secured to the upper wear plates. For example, in FIG. 2, aligned with assemblies 104 and 104′ are respective lower wear plates 105 and 107 and aligned with assemblies 108 and 110 are respective lower wear plates 115 and 115′.

It is recognized that due to the shape of plate 86, FIG. 5, the plate is weak in response to torsion forces and might warp due to internal material stresses resulting from normal manufacturing practices. For example, the plate may be cast, heat treated and later machined to final dimensions. This sequence of manufacturing steps may induce stress in the plate structure which eventually may result in warping the plate. Such warping would tend to displace the reference surfaces 104′, 106′, 108′, and 110′ and pallet 50 from the desired reference plane. For this reason, the system 30, to be described, clamps and locates the surfaces 104′–110′ against fixed work station reference surfaces which define a work station reference plane referenced to the robotic system (not shown) and which are secured to a fixed support at the work station. Such clamping is of sufficiently high force to bend plate 86 to remove any warp caused distortion that may be present in plate 86.

Figure 6:
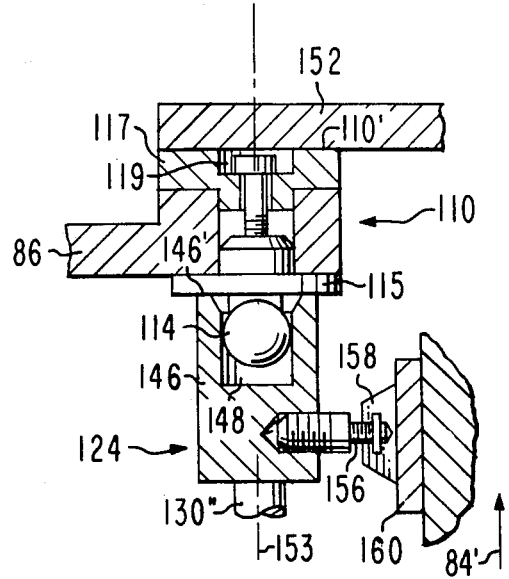
FIG. 6 is a sectional elevation view of the system of FIG. 3 taken along lines 6—6.

Attached to members 108 and 110 are locating spheres 112 and 114, respectively, FIGS. 2 and 5. Spheres 112 and 114 depend from plate 86 aligned with respective members 108 and 110. In FIG. 6, the attachment of sphere 114 is typical. Sphere 114 is attached to a lower wear plate 115 at the underside of plate 86 aligned with upper wear plate 117. Recessed screw 119 secures plate 115 to plate 117 sandwiching plate 86 therebetween. Spheres 112 and 114 define two reference orthogonal axes defining a plate 86 horizontal reference plane. This plane is referenced relative to plate 86 apertures 92 and 94 and spheres 88 and 90, FIG. 5. The alignment of spheres 112 and 114 to a support structure 44 horizontal reference plane thus aligns plate 86 apertures 92 and 94 and spheres 88 and 90. The latter aperture and spheres, in turn, align workpiece 46, FIGS. 2 and 4, relative to spheres 112 and 114 and to the wear plates of plate 86.

In FIG. 2, system 30 includes actuating assemblies 118, 120, 122, and 124 secured to the corners of support structure 44′ and responsive to signals from control 43, FIG. 1. Assembly 122, FIG. 2, lies behind assembly 118 and assembly 124 lies behind assembly 120. Assembly 118 comprises an air cylinder 126 secured to structure 44′. Cylinder 126 has a shaft 128 coupled to a ram rod 130 to which is secured an operating head 132. The ram rod is slidably secured in bushing 134 secured to structure 44′. A cantilevered locating plate 136 is secured to structure 44′ vertically aligned above head 132 and locating assembly 106 of plate 86. Locating plate 136 has a lower reference surface 138 which abuts and locates surface 106′ of the upper wear plate of assembly 106 when clamped thereto, the assembly 106 being in the space between head 132 and plate 136. Assembly 122 is identical to assembly 118 but is aligned to abut and clamp assembly 104, FIG. 5, against the corresponding locating plate 140, FIG. 1, secured to support structure 44. Plate 140, FIG. 1, has a lower reference surface which mates with and faces the reference surface 104′ of the upper wear plate of assembly 104, FIG. 5.

Actuating assemblies 120 and 124, FIG. 2, are somewhat similar to the assemblies 118 and 122 just described. However, assembly 120 differs from those assemblies in that it includes an operating head 142 which has a conical aperture 144 and a circular cylindrical aperture 145 dimensioned to closely receive and locate sphere 112 on the reference axis 147 of support structure 44. Head 142 is coupled to cylinder 126′ by ram rod 130′ and shaft 128′. A cantilevered locating plate 150 secured to structure 44 is vertically aligned above locating assembly 108 and head 142. Plate 150 has a lower reference surface 151 which is aligned with and abuts surface 108' of the upper wear plate of assembly 108 when these structures are clamped. Head 142 has an end surface 149 which when it displaces upwardly abuts the undersurface of the lower wear plate of assembly 108 after sphere 112 enters aperture 145, FIG. 2. Sphere 112 enters aperture 145 before end surface 149 engages the plate 86 lower wear plate to orient plate 86 first. Head 142 at surface 149 then continues its upward motion and lifts plate 86 from carriage 32 and clamps assembly 108 to plate 150. This action of head 142 is in cooperation with the ram rod heads of each of the actuating assemblies, as described below.

In FIGS. 3 and 6, assembly 124 includes an operating head 146 which comprises a member having a channel 148 for receiving sphere 114, rather than a circular aperture as in head 142. The head 146 has an end surface 146'. Head 146 is coupled to an air cylinder (not shown) via ram rod 130" similar to the structure of cylinder 126. The longitudinal axis of channel 148 and axis 147 of assembly 122 (FIG. 2) lie on and define plane 153. The operating head 146 is guided by a guide pin 156 which slides in slot 158 of support 160 attached to structure 44, FIG. 2. The engagement of pin 156 in slot 158 insures the alignment of channel 14B, FIG. 6, and thus, plane 153, in the desired orientation. Plane 153 is referenced to the robotic system at station 26. Channel 148 and aperture 145 thus serve to locate the engaged spheres 112 and 114 of plate 86 in two orthogonal directions relative to support 44.

In FIG. 1, a cantilevered locating plate 152 is secured to structure 44. Plate 152 abuts the upper wear plate locating surface 110' of assembly 110, FIG. 6, when the corresponding ram rod is extended by its air cylinder in the clamp mode. Channel 148 engages sphere 114 prior to the end surface 146' of head 146 abutting lower wear plate 115. This ensures, with the engagement of sphere 112 with aperture 145, FIG. 2, that plate 86 is aligned in the desired horizontal orientation prior to it being clamped in place. The clamping occurs when the operating heads end surfaces abut, force and squeeze assemblies 104, 106, 108, and 110 against respective locating plates 136, 140, 150, and 152. The upper end surface 146' of member 146 eventually abuts plate 115, FIG. 6, to lift plate 86 upward, direction 84', in response to the displacement of its ram rod in that direction. This lifting action occurs substantially simultaneously for all operating heads. The undersurfaces of locating plates 136, 140, 150, and 152, FIG. 1, thus form and define a horizontally oriented locating plane fixed in a vertical location referenced to the robotic system at station 26.

In FIG. 1, when a car 20 is moved in direction 22 it is automatically stopped at station 26 by the engagement of cam 39 with linkage 35, FIG. 2. Cam 39 via that linkage rotates the car wheel assemblies 34 and 38 to the orientation of FIG. 2. This removes the forward force component on the wheel assemblies, stopping the car. When so stopped, the system appears as in FIGS. 2 and 4 with the television receiver 46 resting on pallet assembly 50 which is resting accurately with respect to movable plate assembly 82 on carriage 32.

When the sensor 42 senses the presence of the stopped car 20, a signal is sent to control 43 to operate the air cylinders 126, 126' and so forth. The operation of air cylinders 126 associated with assemblies 118 and 122 at a work station are delayed a fraction-of-a-second relative to the operation of the air cylinders 126' associated with assemblies 120 and 124. The respective ram rods extend upwardly in directions 84', FIGS. 2 and 4, displacing operating heads 132, 142, 146 (FIG. 6) upwardly in direction 84'. The operating heads continue to be displaced upwardly until the apertures of heads 142 and 146 engage the respective spheres 112 and 114 of plate assembly 82, FIG. 2, and continue upwardly until locating assemblies 108 and 110 are clamped against plates 150 and 152, FIG. 1, aligned therewith. All heads in their upward motion lift plate assembly 82 from carriage 32. In so lifting the plate assembly 82, the end surfaces 149, 146' of respective heads 142 and 146, FIGS. 2 and 6, abut the lower wear plates of plate 86 and push plate 86 toward cantilevered plates 150 and 152, FIG. 1.

The nesting of spheres 112 and 114 in the respective opening 145, FIG. 2, and channel 148, FIG. 6, occurs before the end surfaces of heads 142 and 146 abut the corresponding locating assembly wear plates and before heads 132 of assemblies 128 and 122, FIG. 2, clamp their corresponding locating assemblies to the respective support structure reference plates 136 and 140. The delay of cylinders 126 relative to cylinders 126' permits the desired plate 86 horizontal orientation alignment to occur prior to plate 86 being clamped in place. The clamping action against plates 136, 140, 150, and 152, as mentioned, may bend the otherwise relatively stiff plate 86 somewhat to overcome the inherent possible warpage that might be present in plate 86.

In FIG. 5, it will be recalled that plate assembly 82 rests on the carriage 32 and is located by spheres 96 and 98. In FIG. 4, the locating apertures 92 and 94 of plate 86 are flared outwardly as they approach the plate surface abutting carriage 32. Thus, after plate 86 is lifted from carriage 32, the enlarged flared portions of the locating openings 90 and 94, are poised above and serve to locate the apertures on the corresponding spheres 96 and 98, when the plate 86 is released by the cylinders 126 and 126' and falls by gravity onto carriage 32. The television receiver 46 is thus located in the desired three orthogonal directions referenced to the robotic system at work station 26 by means of the workpiece's location to the pallet plate 52 and the location of pallet plate 52 to the movable plate 86, as described above.

What is claimed is:

1. A system for transferring a body to a work station, said body including means adapted to carry a workpiece, said system for orienting and clamping the transferred body to a support at the work station, said system comprising:

a support having a plurality of stationary spaced reference surface defining a reference plane at said work station;

transfer means movably coupled to the support for displacement into the work station in a coarse alignment with said surfaces at the work station;

said transfer means including a body movably secured thereto, said body having a plurality of spaced reference surfaces, each corresponding to a different one of said support reference surfaces;

said body and transfer means including alignment and securing means for movably securing said body to said transfer means in a given alignment therewith so that the body can displace a limited distance relative to the transfer means while remaining secured to the transfer means;

actuating means secured to the support at the work station including means responsive to said coarse alignment of said transfer means with said support reference surfaces for displacing said body from said transfer means within said limited distance and for locking said body reference surfaces in engagement with said support reference surfaces at said reference plane; and body aligning means secured to said actuating means and to said body for automatically aligning said movably secured body in a fine reference alignment relative to said coarse alignment in response to and during said displacing of said body prior to said locking.

2. The system of claim 1 wherein said aligning means includes first and second sets of spaced mating male and female locating means, each set comprising one element secured to the actuating means and a second mating element secured to said body.

3. The system of claim 1 wherein said actuating means includes a plurality of spaced operating elements, each element corresponding to and aligned with a separate, different body reference surface for clamping that body reference surface against its corresponding support reference surface.

4. The system of claim 3 wherein said actuating elements each include a ram rod for lifting said body from said transfer means, said aligning means including a first set of mating alignment elements comprising a hemispherical surface on one of said body and ram rods and a mating conical opening in the other of said body and ram rods and a second set of mating alignment elements comprising a second hemispherical surface on one of said body and ram rods spaced from the first set and a tapered linear slot in the other of said body and ram rods, each set of elements being aligned with a different body reference surface when said body is in said coarse alignment.

5. The system of claim 1 further including a pair of hemispheres on said transfer means, said body having a pair of openings each adapted to closely receive a corresponding hemisphere, said openings each including a diverging edge portion facing said corresponding hemisphere.

6. The system of claim 1 wherein said support and body each include four spaced reference surfaces, said body aligning means including first and second hemispheres secured to the body in spaced relation and aligned with corresponding first and second body reference surfaces and first and second spaced openings in said actuating means, said openings being aligned so as to define a corresponding body reference point and alignment and are adapted to be aligned with a different hemisphere when said transfer means is aligned with said support surfaces, said actuating means engaging said openings with the respective hemispheres during said displacing for clamping said hemispheres to and in said openings.

7. A transfer system for transferring and locating a body at a work station, said system comprising:

a body having a set of first spaced reference surfaces;

a support fixedly secured at said work station, said support having a second set of spaced reference surfaces lying in at least one support reference plane, each second surface having a corresponding first surface, each second surface being adapted to mate with and locate a corresponding different one of said first set of reference surfaces at said at least one support reference plane when said body is aligned with said reference surfaces;

actuating means secured to said support for displacing said aligned body and for forcing said first set of reference surfaces during said displacing into locked engagement with the corresponding ones of said second set of reference surfaces at said at least one reference plane, said actuating means and said body including a first set of mating locating means adjacent one of said body reference surfaces and a second set of mating locating means adjacent a second of said body reference surfaces, said locating means being adapted to engage and locate said body to a support reference alignment prior to said locked engagement; and body transfer means including body securing means for movably securing the body thereto so that the body can displace a limited distance relative to the transfer means while remaining secured to the transfer means, said transfer means including means for moving the body into the work station and for aligning said body with said actuating means, said support including means responsive to said body alignment at said work station for operating said actuating means to thereby align and locate said body at said support reference plane and alignment.

8. The system of claim 7 further including a plurality of work stations, each work station comprising a separate one of said support and actuating means, said transfer means including means for transferring said body to each said work station.

* * * * *